United States Patent Office 2,787,801
Patented Apr. 9, 1957

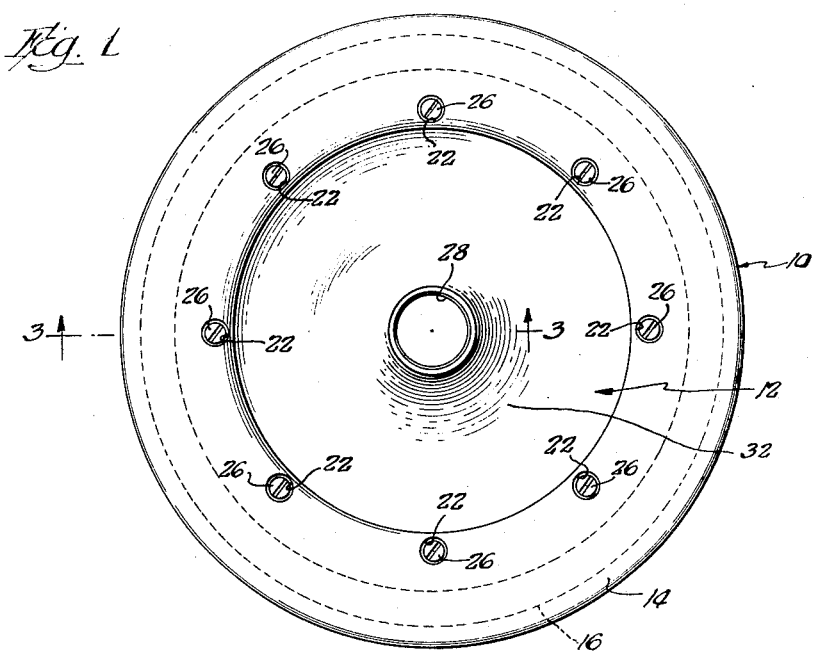
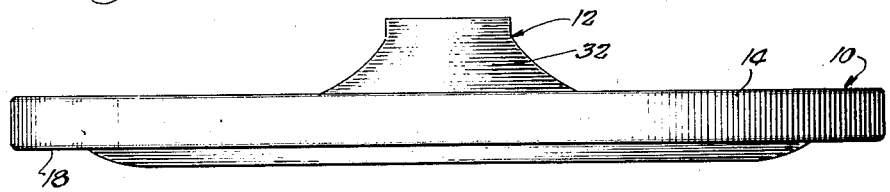
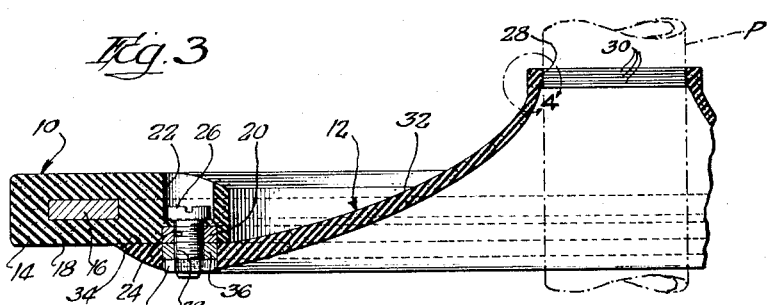
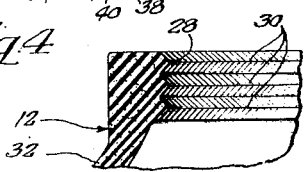
INVENTOR.
JAMES M. BUTLER

2,787,801

PIPE WIPER

James M. Butler, Fullerton, Calif., assignor to Plastic and Rubber Products Company, Los Angeles, Calif., a corporation of California Application December 23, 1955, Serial No. 555,027

4 Claims. (Cl. 15—210)

This invention relates to oil well drilling accessories and particularly to a wiper for removing oil and other substances from the surface of drill pipe in a drill string when the latter is raised in a well casing.

Pipe wipers, in general, are well known in the art and are employed to perform a scraping action on the surface of drill pipe when the latter is moved upwardly in a well casing either during removal of the pipe from the casing or during up strokes of the pipe in certain types of drilling operations. Such wipers consist, generally, of an outer, relatively rigid body portion and a central, apertured wiper element of resilient material surrounding the pipe. The body portion has an internal diameter substantially larger than the greatest transverse dimension along the pipe, such as at couplings or other radial enlargements. The diameter of the aperture in the wiper element is substantially equal to or smaller than that of the pipe so that the wall of the element, defining said opening, is adapted to resiliently engage the outer surface of the pipe for scraping oil and other substances from the latter during relative axial movement of the wiper and pipe. The wiper element, being of resilient material, accommodates passage of the wiper over enlarged couplings or other radial protuberances on the pipe by stretching of the material of the wiper element about its central opening.

A major object of this invention is the provision of a pipe wiper of the class described which is designed to perform an improved scraping or wiping action throughout a complete 360° of the pipe and which embodies a removable wiper insert so as to permit more economical reconditioning of the wiper, by replacement of the insert only, after the useful life of the latter has been expended due to wear and deterioration thereof.

Another object of the invention is the provision of a pipe wiper of the class described embodying a removable wiper insert of novel design wherein the wiping surface is maintained in substantial parallelism with the pipe surface during up strokes of the pipe so that an improved wiping action is obtained.

Yet another object of the invention is a pipe wiper of the class described embodying a removable wiper insert of resilient material and which is so designed as to provide greater resiliency of the insert about the wiping opening so as to facilitate passage of the insert over enlarged couplings, and the like, with less deterioration of the insert and yet provide sufficient rigidity of the insert to achieve a highly efficient wiping action.

A further object of the invention is the provision of a pipe wiper of the class described which embodies an outer, circular, relatively rigid body portion and a central, resilient wiper insert and which embodies an improved arrangement for removably securing the insert to the body portion so that wear and deterioration of the insert is substantially reduced.

The present invention may be best understood from the following detailed description thereof, taken in conjunction with the annexed drawings wherein:

Fig. 1 is a top plan view of the instant pipe wiper;
Fig. 2 is an enlarged, elevational view of the wiper of Fig. 1;
Fig. 3 is an enlarged section taken substantially along line 3—3 of Fig. 1; and
Fig. 4 is an enlarged detail view of the area enclosed by the circular arrow 4 in Fig. 3.

Referring now to these drawings, the present wiper comprises an outer, annular body portion 10 and a central wiper insert 12. Wiper body 10 includes an annular molded ring 14 of suitable oil resistant material such as neoprene in which is bonded a central metallic ring 16. This ring 16 serves as a reinforcing element for lending rigidity to the outer body portion 14. As previously described, the internal diameter of the annular body portion 10 is made substantially greater than the maximum transverse dimension encountered along the string on which the wiper is to be used so that the body portion may freely pass over any couplings or other enlargements on the string. The lower end face 18 of the ring is substantially planar, and bonded in the ring 14, adjacent its inner periphery, is a second metallic ring 20 whose lower end face is coplanar with the lower face 18 of the ring 14. Ring 14 and metallic ring 20 are formed at equiangularly spaced points therearound with a series of aligned axial openings 22 and 24, the openings 22 in the ring 14 being somewhat larger in diameter than the openings 24 in the ring 20 so that the former openings are adapted to accommodate the heads of bolts 26 while the latter openings in the ring 20 are of a diameter to slidably receive the shanks of the bolts 26.

The wiper insert 12 is made of suitable resilient, oil resistant and tear resistant material such as certain types of neoprene and other synthetic rubbers and has a generally conical configuration. The insert is provided with a central opening 28 whose wall is formed with generally saw-tooth-shaped, annular ribs 30 the tips of which lie substantially on a common, cylindrical surface concentric with the axis of the wiper. The wall thickness of the insert about the opening 28 is relatively great as compared with the wall thickness of the insert immediately below the opening, while the wall 32 of the insert progressively decreases in thickness from the outer periphery thereof, at the base of the cone, to said portion of reduced thickness immediately below the opening 28. A portion of the wall 32, at the base of the cone, has a surface 34 in substantially a radial plane and abutting the lower surface 18 of the ring 14, as shown. Bonded in this base portion of the cone is a third metallic ring 36 whose upper surface is coplanar with the surface 34 of the insert and which abuts the lower surface of the ring 20 in the wiper body. Metallic ring 36 is formed with openings 38 in alinement with the openings 24 in the metallic ring 20 which openings slidably receive the lower ends of the shanks of the bolts 26. Nuts 40 are threaded on the shanks of bolts 26 for securing the insert 12 to the body 10 with the upper face and lower face of the rings 36 and 20, respectively, in face abutting relationship.

The rings 20 and 36 provides an effective means for firmly clamping the insert 12 to the body 10 throughout the entire periphery of the insert so that the stresses created in the insert during wiping action will be equally distributed around the entire insert body rather than at localized points as would occur if the insert 36 were omitted. The insert 12 is thus less prone to wearing, tearing and deterioration from such stresses.

The cone shape of the insert 12 tends to result in the creation of substantially axially directed tensile stresses in the material of the insert wall 32 immediately below the wiping opening 28 during relative movement of the wiper downwardly over a drill pipe so as to substantially eliminate tilting or canting of the insert about the opening 28. All of the ribs 30 are, thereby, retained in wiping engagement with the pipe throughout a complete 360° of the opening. The decreasing wall thickness of the insert provides for sufficient rigidity of the insert to promote an efficient wiping action while providing for sufficient resiliency of the insert about the opening 28 to accommodate enlargement of the opening 28, by stretching of the material of the insert, to permit passage of the latter over enlarged couplings or the like.

A highly advantageous feature of the invention is the ability to remove the insert 12 from the body 10 after wearing, deterioration, or tearing of the insert for replacement thereof by a new insert so that the present wiper may be economically reconditioned after a period of use by such replacement of only the insert rather than the entire wiper. Also, the removability of the insert accommodates interchanging of one insert with another insert having a central wiping opening of a different size whereby the wiper may be used in conjunction with drill pipe of varying diameters.

While certain preferred embodiments of the invention have been described and illustrated, it will be apparent that numerous modifications in design and arrangement of parts is possible within the scope of the following claims.

I claim:

1. A pipe wiper of the class described comprising: a radially outer, annular wiper body including a relatively thick ring of resilient, oil resistant material; a metallic ring bonded to said first mentioned ring and having a face substantially coplanar with a face of said first mentioned ring; a wiper insert of generally circular configuration having a central wiping aperture; said insert being of resilient material and having a generally annular planar surface adjacent its outer periphery; a second metallic ring bonded to said insert in the zone of said planar surface thereof and having a face substantially coplanar with the latter surface; and removable fastening means extending through the metallic rings removably securing the insert to the body with said aperture concentric with the body.

2. The subject matter of claim 1 wherein said insert is bonded to the second ring throughout a complete 360° of the latter.

3. A pipe wiper of the class described comprising: a radially outer, annular wiper body including a relatively thick ring of resilient, oil resistant material, and a metallic reinforcing ring imbedded therein; a second metallic ring bonded to said first mentioned ring and having a face substantially coplanar with a face of said first mentioned ring; a wiper insert of generally conical configuration having a central wiping aperture; the insert about said aperture being generally cylindrical and the inner wall of said opening being formed to provide a series of saw-toothed ribs whose tips lie on a common cylindrical surface concentric with the wiper; said insert being of resilient material and having a generally annular planar surface adjacent its outer periphery; said insert decreasing in wall thickness from said outer periphery toward said aperture; a third metallic ring bonded to said insert in the zone of said planar surface thereof and having a face substantially coplanar with the latter surface; and removable fastening means extending through the second and third metallic rings for removably securing the insert to the body with said aperture concentric with the body.

4. The subject matter of claim 1 wherein said removable fastening means comprise bolts extending through said metallic rings and nuts threaded on said bolts, said insert having clearance openings for said bolts in the side of the insert opposite said annular planar surface, said openings extending to the other face of the second mentioned metallic ring whereby the material of said insert is not compressed when nuts are tightened on said bolts and distortion of the insert is avoided.

References Cited in the file of this patent

UNITED STATES PATENTS

| | | |
|---|---|---|
| 2,272,395 | Ballagh | Feb. 10, 1942 |
| 2,444,653 | Kennedy et al. | July 6, 1948 |
| 2,548,127 | Slavens | Apr. 10, 1951 |
| 2,550,487 | MacClatchie | Apr. 24, 1951 |
| 2,580,727 | Bryan | Jan. 1, 1952 |
| 2,620,504 | Slater | Dec. 9, 1952 |
| 2,697,240 | Barnes et al. | Dec. 21, 1954 |